W. E. HEATH.
RECEPTACLE CAPPING MACHINERY.
APPLICATION FILED FEB. 5, 1916.

1,233,468.

Patented July 17, 1917.
9 SHEETS—SHEET 1.

Witness
Allen E. Peck

Inventor
William E. Heath.
Herbert E. Peck
Attorney

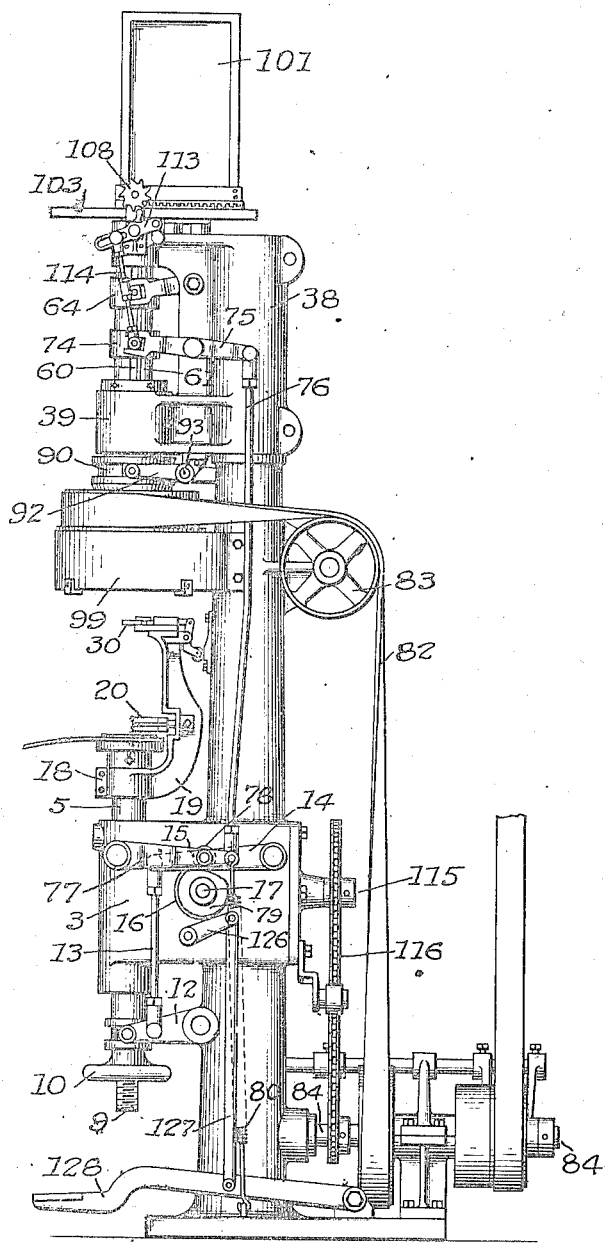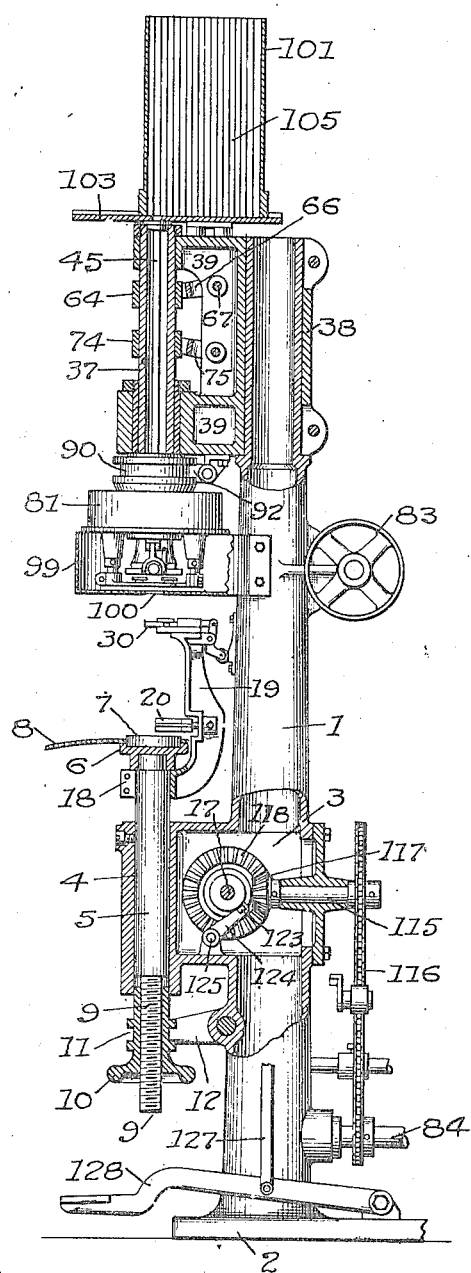

W. E. HEATH.
RECEPTACLE CAPPING MACHINERY.
APPLICATION FILED FEB. 5, 1916.
1,233,468.
Patented July 17, 1917.
9 SHEETS—SHEET 3.
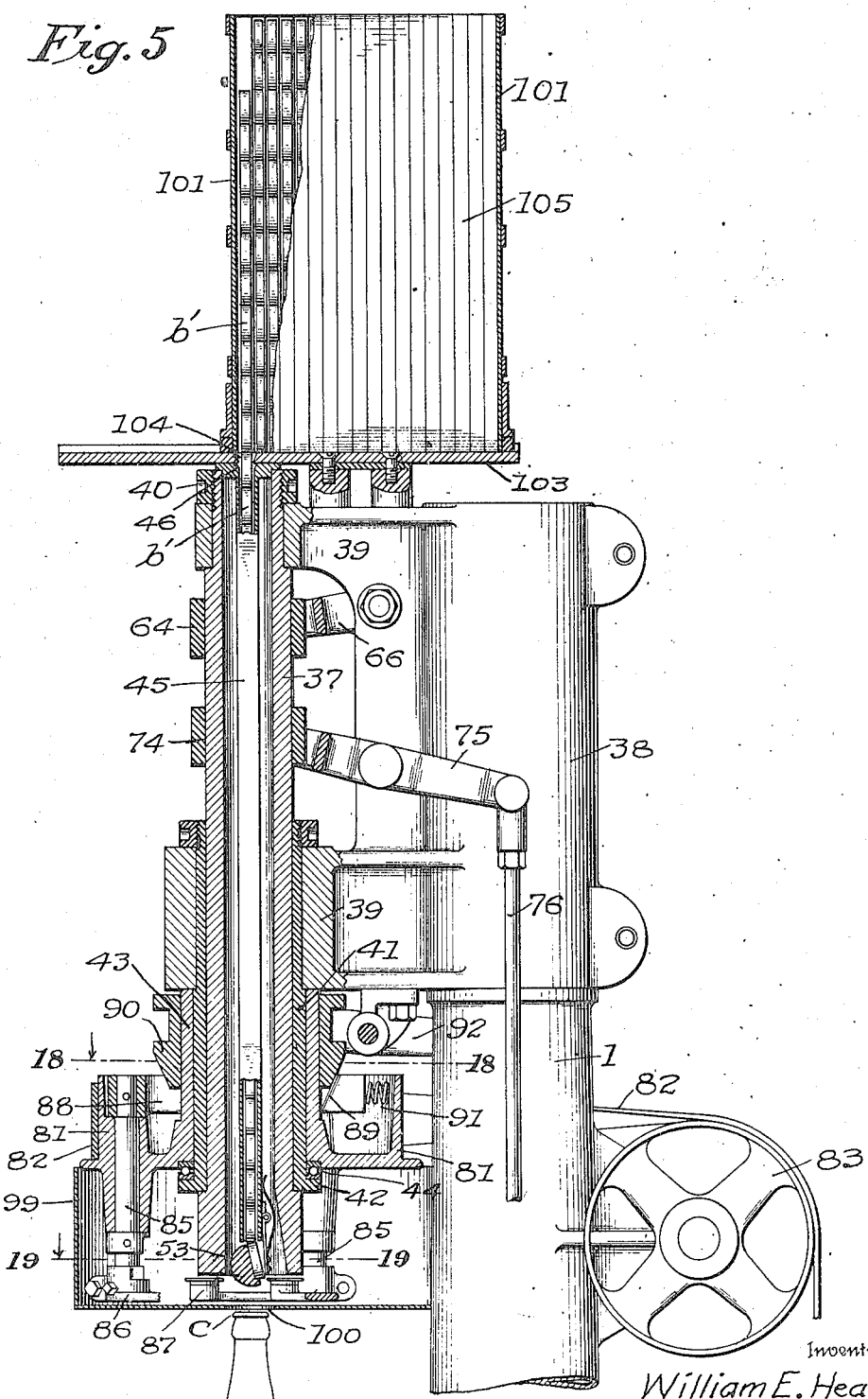

W. E. HEATH.
RECEPTACLE CAPPING MACHINERY.
APPLICATION FILED FEB. 5, 1916.
1,233,468.
Patented July 17, 1917.
9 SHEETS—SHEET 4.
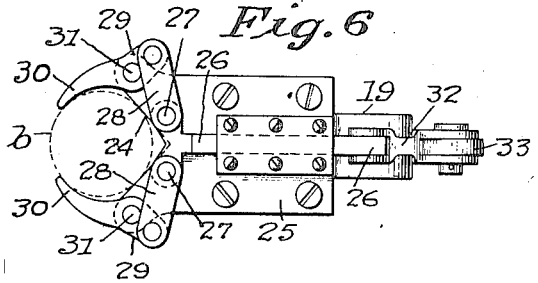
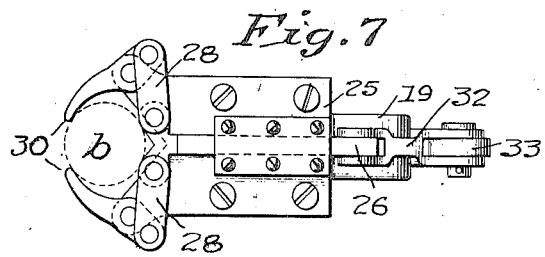
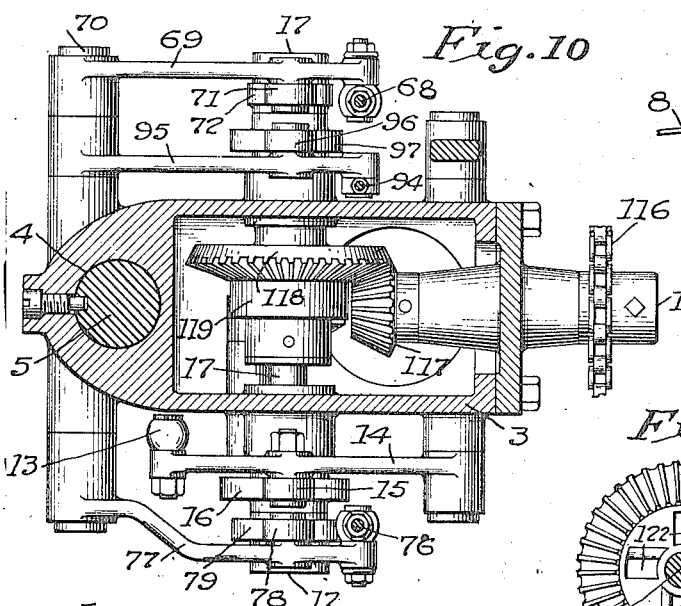
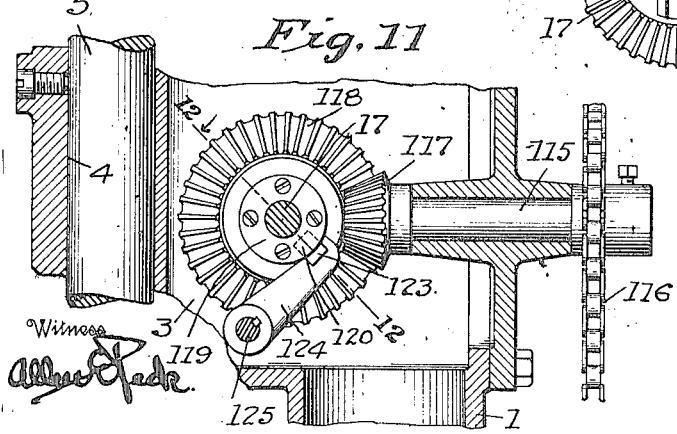
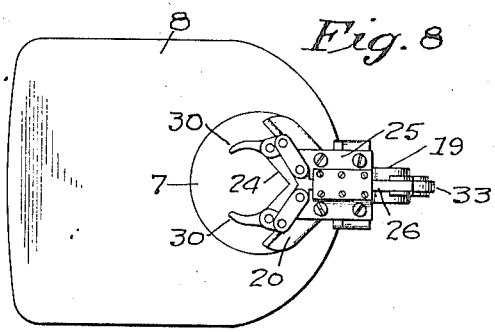
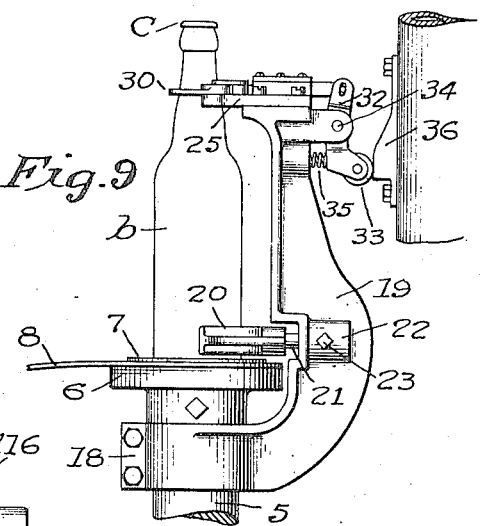
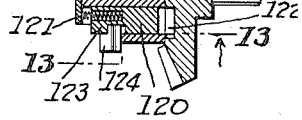
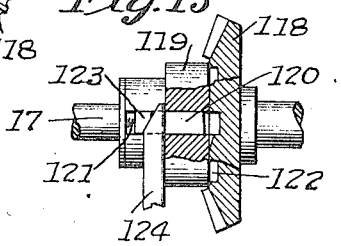
Inventor
William E. Heath.
Attorney

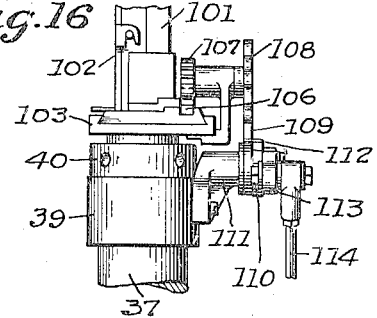
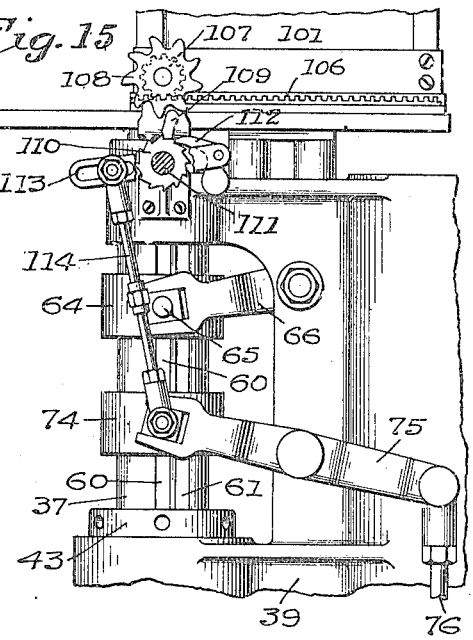
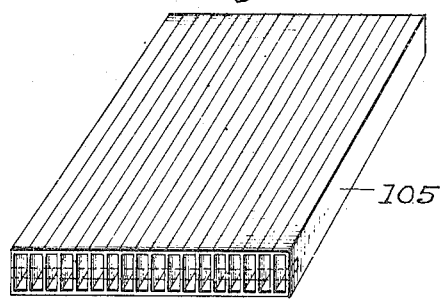
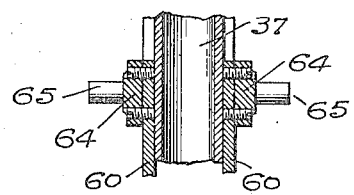
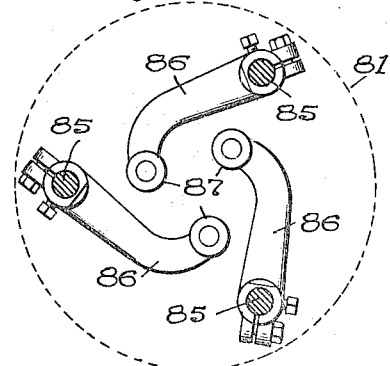
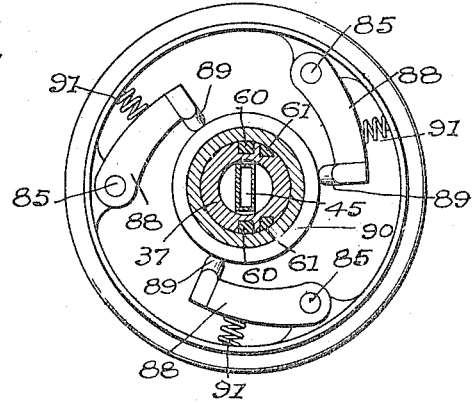

W. E. HEATH.
RECEPTACLE CAPPING MACHINERY.
APPLICATION FILED FEB. 5, 1916.

1,233,468. Patented July 17, 1917.
9 SHEETS—SHEET 6.

Witness
Allen E. Peck

Inventor
William E. Heath.
Herbert E. Peck
Attorney

W. E. HEATH.
RECEPTACLE CAPPING MACHINERY.
APPLICATION FILED FEB. 5, 1916.

1,233,468.

Patented July 17, 1917.
9 SHEETS—SHEET 7.

Inventor
William E. Heath.

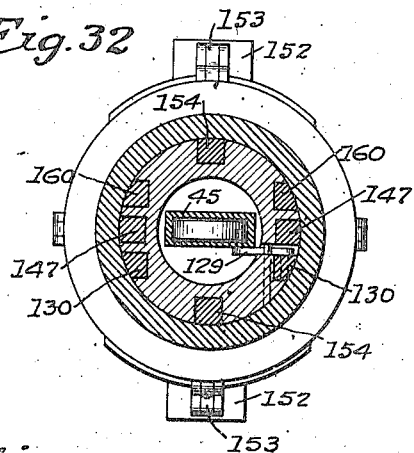
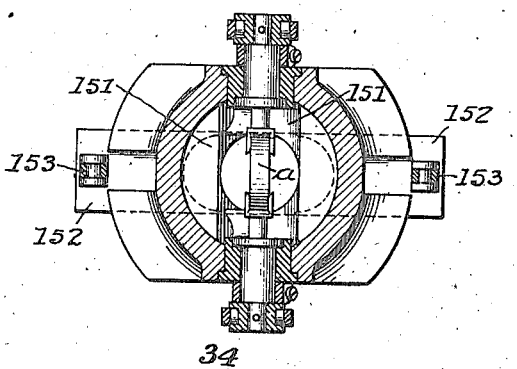
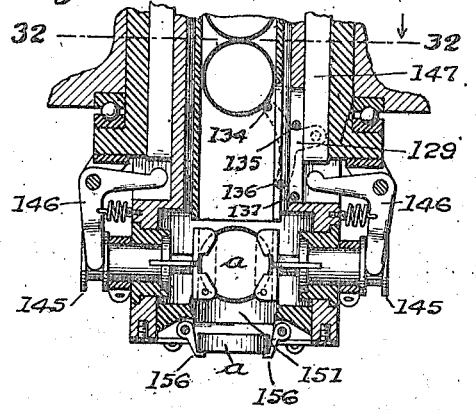
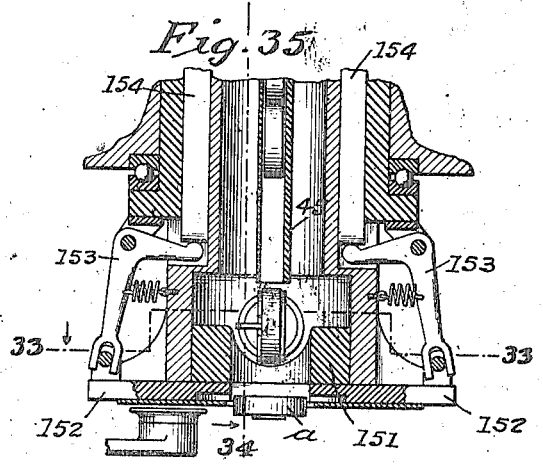
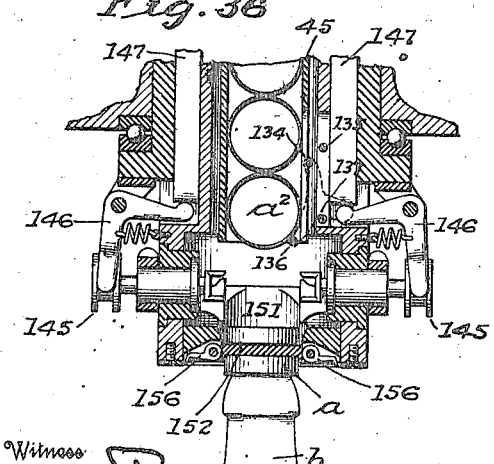
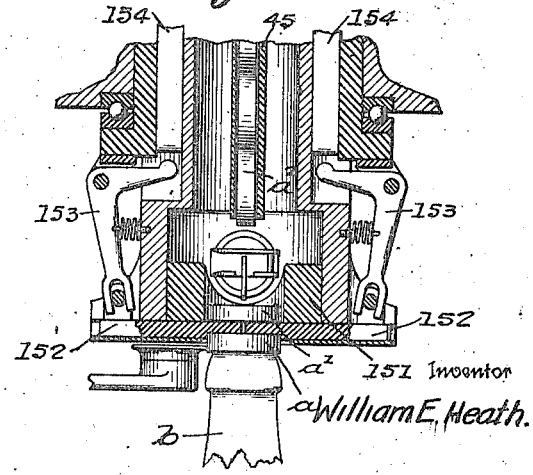

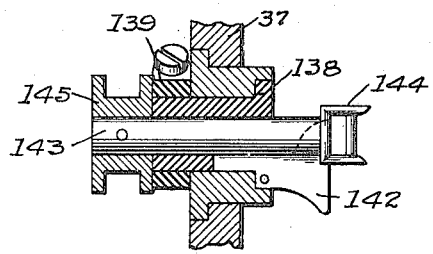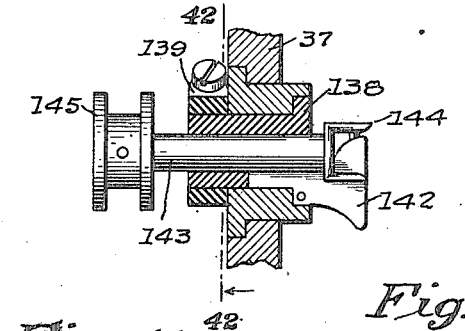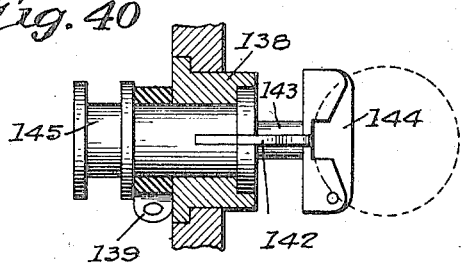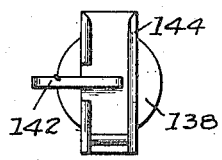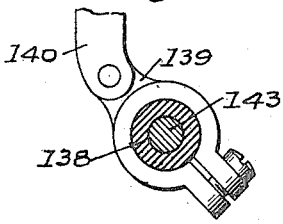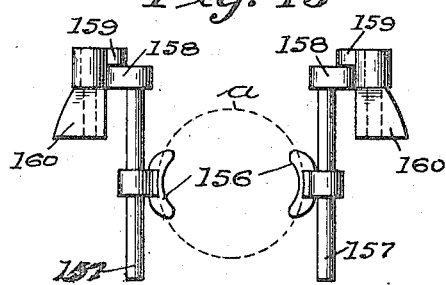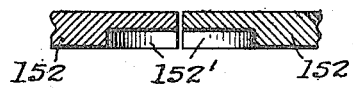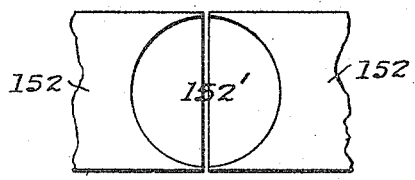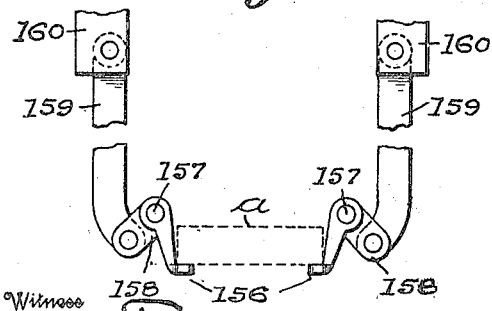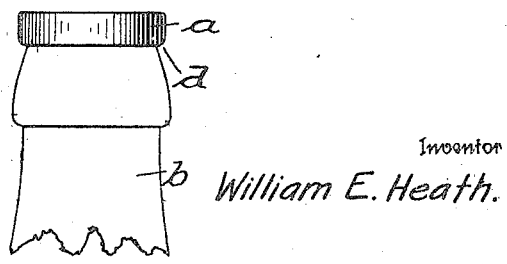

UNITED STATES PATENT OFFICE.

WILLIAM E. HEATH, OF BALTIMORE, MARYLAND, ASSIGNOR TO HEATH SELF-OPENING STOPPER COMPANY, OF BALTIMORE, MARYLAND, A CORPORATION OF DELAWARE.

RECEPTACLE-CAPPING MACHINERY.

1,233,468.  Specification of Letters Patent.  Patented July 17, 1917.

Application filed February 5, 1916. Serial No. 76,398.

*To all whom it may concern:*

Be it known that I, WILLIAM E. HEATH, a citizen of the United States, residing at Baltimore, in the State of Maryland, have invented certain new and useful Improvements in and Relating to Receptacle-Capping Machinery, of which the following is a specification.

This invention relates to certain improvements in machines for capping bottles and other containers; and the objects and nature of the invention will be readily understood by those skilled in the art in the light of the following explanation of the accompanying drawings illustrating what I now believe to be the preferred embodiment or mechanical expression of my invention from among other forms, arrangements and constructions within the spirit and scope thereof.

It is an object of the invention to provide a machine wherein stiff metal sealing caps are locked on the bottle mouths by a rotating spinning or curling device with means for automatically feeding caps to the bottles for spinning thereon so arranged that the line of feed of the caps will be concentric with the axis of rotation of the spinning device.

A further object of the invention is to provide a machine for spinning caps on bottles, wherein the caps are automatically fed to the bottles through and longitudinally of the head of the machine.

A further object of the invention is to provide a machine for locking stiff metal caps on bottles by a spinning device centered and rotating on the head of the machine, with means for feeding the caps longitudinally through said head and successively presenting the same at the spinning position and to receive a bottle mouth when said bottle is moved to bring its mouth to cap-receiving position.

A further object of the invention is to provide a machine for locking stiff metal sealing caps to bottle mouths by spinning the depending vertical flanges of the caps under external shoulders on the bottle mouths, wherein the caps are automatically fed through the machine head and are automatically applied to the bottle mouths and are then spun thereon by a spinning device rotating on said head as an axis.

A further object of the invention is to provide automatic mechanism for feeding metal sealing caps through the head of a capping machine, from a carton in which said caps are packed in a plurality of parallel tubes, and for feeding said carton forward as the supply of caps in a tube is exhausted, until the caps have been discharged from all of the tubes of the carton, and to enable the operator to remove the empty carton and insert a full carton.

A further object of the invention is to provide a machine for locking stiff metal sealing caps on bottle mouths, wherein the caps are automatically fed down through the head of the machine and are turned over one at a time and presented in proper position to receive a bottle mouth and withstand the sealing pressure on the bottle mouth during the operation of locking the cap on said mouth.

A further object of the invention is to provide a machine for locking metal sealing caps on bottle mouths, with improved means for automatically centering each bottle mouth preparatory to its arrival at the sealing-cap-receiving and locking position.

A further object of the invention is to provide a simple, efficient and accurate automatic cap feed for bottle capping machinery.

A further object of the invention is to provide improvements in combinations, arrangements, and the construction of parts, with the end in view of producing a highly advantageous and efficient machine for applying metal sealing caps to bottles and other containers.

With the foregoing and other objects in view my invention consists in certain novel features in construction, arrangement, and combinations as more fully and particularly set forth and specified hereinafter.

Referring to the accompanying drawings:—

Fig. 3, is an elevation showing the opposite side of the machine.

Fig. 4, is a side elevation, portions of the machine being shown in vertical longitudinal section.

Fig. 5, is a side elevation of a portion of the upper part of the machine, the head and the spinning device of the machine being shown in central longitudinal section, the feed table, and carton holder being shown in vertical section, a carton being shown in said holder and partially broken away to show several tubes thereof loaded with caps.

Figs. 6 and 7, are detail top plan views of the bottle centering device showing the same gripping bottle necks of different diameters.

Fig. 8, is a detail top plan of the bottle centering device in completely open bottle-receiving position, the V-bottle stop below said device, the bottle table or platform, and the bottle guide plate leading to said table or platform.

Fig. 9, is a detail side elevation of the bottle table or platform, the V stop, the centering device and its operating means, a portion of the machine frame or column, and a bottle on the table.

Fig. 10, is a cross section taken in the plane of the line 10—10, Fig. 2.

Fig. 11, is a detail vertical section on the line 11—11, Fig. 1.

Fig. 12, is a detail section on the line 12—12, Fig. 11.

Fig. 13, is a detail section on the line 13—13, Fig. 12.

Fig. 14, is a detail end elevation of the gear member of the main clutch.

Fig. 15, is a detail side elevation of the upper part of the machine showing a portion of the carton holder and the means for feeding the same.

Fig. 16, is a detail front elevation of the upper end of the machine frame, the feed table, and portions of the carton holder and its feeding means.

Fig. 17, is a detail vertical section through a portion of the machine, a pair of slide bars thereon, and an operating collar for and connecting said bars.

Fig. 18, is a detail cross section on the line 18—18, Fig. 5.

Fig. 19, is a cross section on the line 19—19, Fig. 5.

Fig. 20, is a detail perspective of an empty carton, dotted lines indicating a detachable strip that can be passed across the open ends of the tubes to retain the caps therein, and that can be secured at its ends to the edges of the carton.

Figure 24:
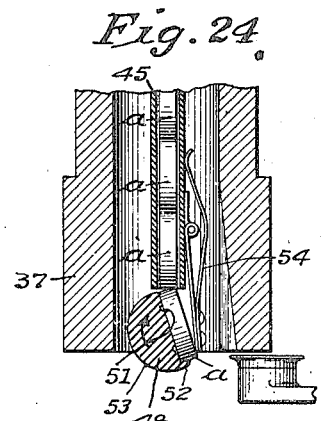
Fig. 24, is a vertical section on the line 24—24, Fig. 21, a spinning or curling roll being shown.
Figure 26:
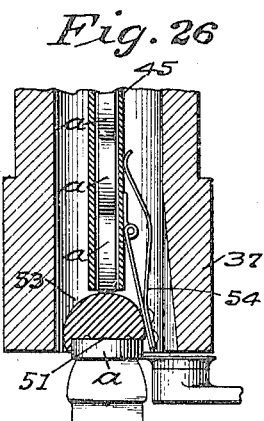
Figure 25:
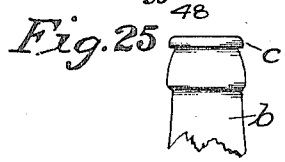
Fig. 25, is a side elevation of the mouth of a bottle shown in approximately the position it will assume with respect to Fig. 24, when the bottle is on its table and before the bottle has been elevated to cap-receiving position, and when the turn-over chuck is in the position disclosed by Fig. 24.

Fig. 26, is a detail sectional view of the parts illustrated by and in the same plane as the section Fig. 24, but showing the turn-over chuck in turned-over cap-applying position, a bottle mouth in cap receiving position, and a spinning curling roll in its initial spinning or curling position with respect to the straight depending flange of the cap on the bottle and not yet turned under the shoulder thereof.

Figure 27:
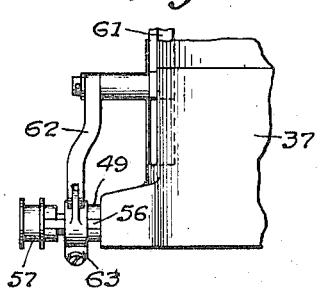

Fig. 27, is a detail elevation of a portion of the machine head, certain parts being omitted.

Figure 28:
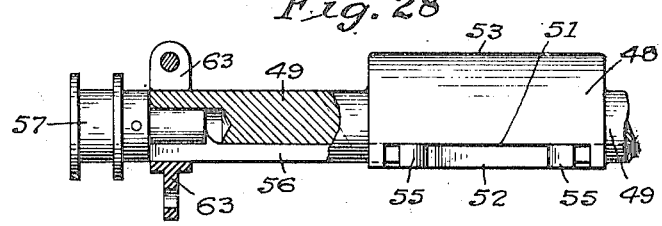

Fig. 28, is a detail edge view of a portion of the turn-over chuck, a portion of one of the chuck journals being shown in longitudinal section.

Figure 29:
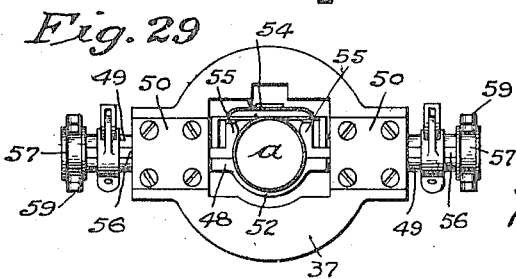

Fig. 29, is a detail plan view of the bottom end face of the machine head in inverted position, the turn-over chuck holding a cap and being in its position shown by Fig. 26.

Figure 30:
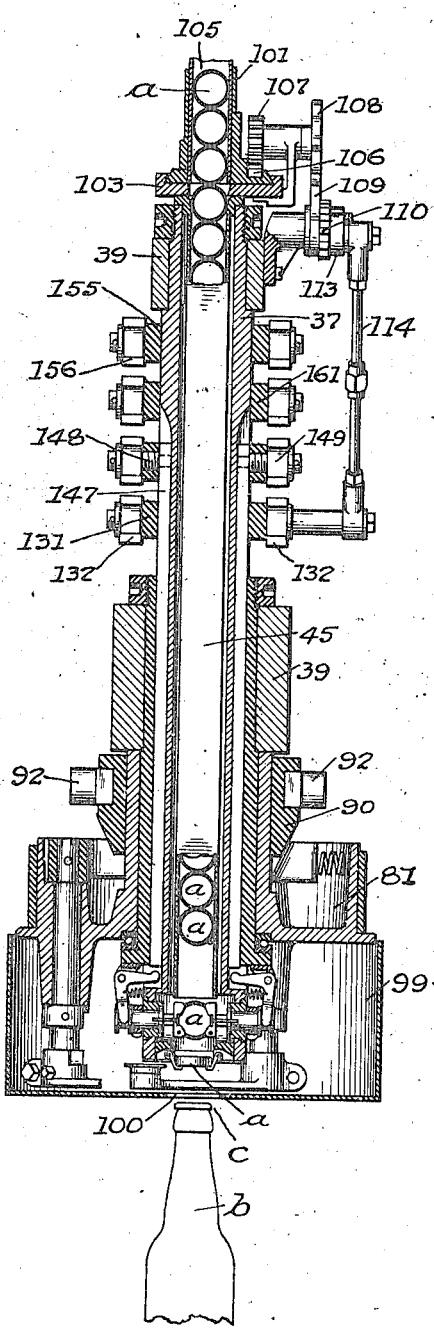
Figure 31:
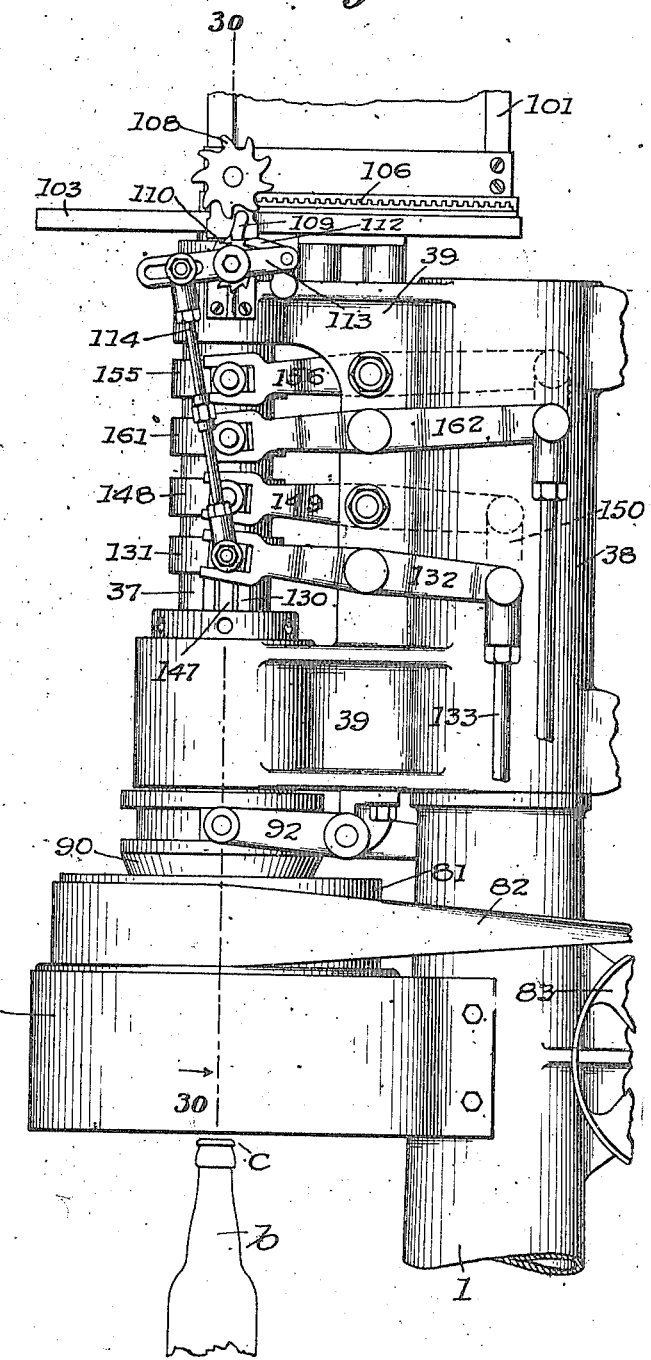

Fig. 30, is a vertical longitudinal section through the modified construction of Fig. 31, being taken in the plane of the line 30—30, Fig. 31.

Fig. 31, is a side elevation of the head portion of a capping machine embodying certain modified constructions.

Fig. 32, is a cross section on the line 32—32, Fig. 34.

Fig. 33, is a cross section on the line 33—33, Fig. 35.

Fig. 34, is a vertical section on the line 34—34, Fig. 35.

Fig. 35, is a vertical section similar to Fig. 34, but taken in a plane at right angles to the plane of the section Fig. 34.

Fig. 36, is a vertical section taken in the plane of the section Fig. 34, but showing the parts in different positions.

Fig. 37, is a vertical section taken in the same plane as Fig. 35, but showing the parts in the same positions as in Fig. 36, and in different positions from those assumed thereby in Fig. 35.

Figs. 38 and 39, are detail sectional views showing one half of the modified turn-over chuck and its stripper in different positions.

Fig. 40, is a section showing the parts of Figs. 38 and 39, in the same position as Fig. 38, so far as the relative positions of the stripper and clutch member are concerned, but otherwise in a different position from that in which said parts appear in both Figs. 38 and 39, dotted lines indicating a cap.

Fig. 41, is a detail inner end view of the clutch member appearing in Figs. 38 to 40.

Fig. 42, is a detail vertical section on the line 42—42, Fig. 39.

Fig. 43, is a diagrammatical or detail plan view of the swinging fingers of the modification, which holds the cap (shown in dotted lines) in bottle receiving position, the rock shafts carrying the same, and the slides for rocking said shafts, Fig. 44, is a detail or diagrammatical side elevation of the elements of Fig. 43, dotted lines showing a cap in edge view upheld by said fingers.

Figs. 45 and 46, are a detail longitudinal section and an inverted plan of portions of the cap receiving sliding plates that receive the caps from the turn-over chuck and that drop the same onto said swinging fingers.

Fig. 47, is a side elevation of a bottle neck showing a cap locked thereon by having its depending flange spun under the exterior bottle mouth shoulder.

In the capping machine of my invention, the bottle to be capped is placed on a table or platform and against a positioning device and in a centering device. The main clutch of the machine is then thrown into action, usually by depressing a treadle, to operatively connect the table actuating means with the power. The table thereupon moves up on its operative stroke carrying the uncapped bottle and on the completion of said stroke moves down on its return stroke to normal position carrying the capped bottle and then comes to rest, as the clutch then automatically disconnects the table actuating means from the power. The clutch when thrown into action causes the operating strokes of the various moving parts of the machine necessary to supply a cap at the cap-applying and locking position and for capping one bottle, and is then automatically thrown out of action. When the bottle is started on its upward movement, the centering device is automatically brought into action to accurately center and aline the mouth of the bottle with respect to the cap held in position to receive the same. The mouth of the bottle moves up into a cap held in position waiting for the bottle and applies the desired upward sealing pressure against the cap during the completion of the upward stroke of the table, and while rotating curling or spinning rolls close in against the depending edge of the cap flange and turn the same in under the exterior shoulder of the bottle and thereby lock the cap thereon.

When the lower edge of the cap flange has thus been spun or curled inwardly to locking position, said rolls are withdrawn and the bottle table drops. The supply of caps is maintained in a series of parallel vertical tubes in a carton carried by a holder arranged above the head of the machine. The caps drop one at a time from a carton tube into a vertical cap tube extending longitudinally through the head of the machine. At each stroke of the machine, a cap from said cap tube is turned over and held in bottle-mouth-receiving position with its flange depending, so that on each upward operative stroke of the bottle table, a cap will be held in proper position to receive said bottle, and the cap spinning devices will be closed in to the cap in proper sequence.

The caps are fed down by gravity from the carton and through the machine head, and the carton is automatically fed forward to register a filled tube of caps with the downward passage through the head as the caps are exhausted from the preceding tube of the carton. When all of the caps have been fed from the carton, the carton carrier is moved back to its starting position and a filled carton is inserted.

The machines illustrated are provided with suitable supporting means. For instance, I show a strong vertical column 1, rising from a base 2. The lower portion of the column is formed or provided with a forwardly projecting rigid lateral enlargement or knee 3, at its outer end formed with a vertical slideway, guide passage or bore 4, extending completely therethrough and slidably receiving and guiding the vertical shank or standard 5, of the bottle table or platform 6. This table is arranged above the knee and is mounted on the upper end of the standard 5, and at its top side is preferably formed with a socket or depression in which is located the horizontal rubber mat or other suitable cushioning disk 7, on which the bottle on the table is carried. The table 6, is also preferably provided with a forwardly projecting and downwardly inclined bottle guide plate or floor 8, designed to engage the bottom of the bottle and guide the bottle upwardly and rearwardly to the cushion 7, during the operation of placing the bottle by hand on the table. This front inclined guide plate is of advantage in overcoming the tendency of operators to hold the bottles at too great elevations when placing the same on the cushion 7, and thereby strike the bottle necks or mouths against parts of the machine above the table.

The lower end 9, of the standard that depends from the knee 3, is preferably longitudinally screw threaded to receive the longitudinally elongated hand wheel nut 10, longitudinally adjustable thereon, and provided with exterior annular groove 11, to receive the forked end of the lever 12, by which the table is raised and lowered.

The lever 12, extends from the column to which its rear end is fulcrumed on a transverse axis, forwardly and is forked to enter the groove 11, of the nut 10, so that the table will be raised and lowered by vertically swinging the lever. The lever is swung by an upright link or rod 13, at its lower end pivotally joined to said lever and at its upper end pivotally joined to the free end of a vertically swingable lever 14. The lever 14, is provided with a roller 15, engaging a rotary cam 16, fixed on cam shaft 17. The lever 14, is yieldingly held at its limit of downward movement with its roller 15, bearing down on the top surface of the periphery of the cam which cam upholds the levers 14, 12, and the table. The weight of the table and connected parts is sufficient to hold the roller to the cam in following the low portions thereof while the elevations of the cam are properly located to cause elevation of the table in proper sequence and the distance required to carry the bottle thereon to the cap-receiving and compressing position and maintain the same at such position for the length of time necessary for the completion of the cap spinning operation.

By means of the rotary nut 10, the non-rotary longitudinally slidable standard 5, of the table can be adjusted vertically with respect to the nut to raise or lower the normal elevation of the table with respect to the elevation of the cap-holding and spinning devices to accommodate long and short bottles, within certain limits, and to insure the desired sealing pressure and accuracy in operation.

The table standard 5, carries an upright frame or bracket 19, extending upwardly toward the head of the machine and arranged between the bottle positioned on the table and the column 1. The lower end of this bracket is provided with a forwardly projecting split clamp 18, rigidly clamped on the standard just below the table. Just above and in rear of the table, the bracket carries a back stop, gage or positioning device against which the body of the bottle is forced when the bottle is placed on the table. This device is in the form of a forwardly projecting V-shaped jaw or stop 20, to properly position the body of the bottle on the table.

In the example illustrated, the V-shaped jaw 20, is provided with a rearwardly extending shank 21, adjustable longitudinally in a horizontal socket 22, formed in the bracket 19. The jaw is clamped in the desired adjustment, determined by the diameter of the body of the bottles to be operated on, by a set screw 23, to lock the shank in the socket (see Fig. 9). The upper end of the bracket 19, carries a device for grasping the bottle by its neck portion to hold the bottle against lateral displacement during the cap-applying and spinning operations and particularly to properly aline, center and position the mouth of the bottle with respect to the cap-holding and spinning devices. This centering and holding device consists of a fixed V-jaw and a pair of swinging grasping fingers arranged to close partially around the bottle neck and press the same back into and against the V-jaw, and to thus hold the same until the bottle table has approximately completed its return stroke and returned to normal lowered position whereupon the fingers are automatically swung in opposite directions to opened position to permit release of the bottle, in which opened position the fingers remain to permit positioning of another bottle on the table. The fingers are then automatically swung to bottle grasping position as the table moves on its upward stroke so as to firmly grasp and center the bottle neck before the bottle mouth reaches cap receiving position.

As will appear from Figs. 6 to 9, the jaw is formed by the V-shaped formation 24, of the projecting front end of a horizontal plate 25, fixedly secured on the top end of the bracket 19, and formed with a longitudinal guideway in which the slide 26, is confined to reciprocate. The front end of the slide is formed with a V-notch of the same angle as the V jaw 24, and also with a pair of diverging ears 27, to which oppositely extending horizontally-swingable links 28 are pivotally joined. The outer ends of these links are pivoted to the heels 29, of the curved horizontally swingable grasping fingers 30, pivoted or fulcrumed at 31, to the front outer corners of the V jaw 24. The fingers are opened and closed through the medium of slide 26, by an upright vertically swingable lever 32, arranged in rear of the bracket and fulcrumed thereto at a point 34, intermediate the length of the lever and having its upper end pivotally joined to the projecting rear end of the slide 26, and having its lower end projected rearwardly and carrying a roll 33. A suitable spring device is provided to constantly and yieldingly tend to maintain the grasping fingers in bottle neck gripping positions and at their limits of movement toward each other. In the particular example illustrated, I show coiled expansive spring 35, for this purpose, compressed between the bracket 19, and the lower arm of lever 32, and constantly acting to press said lower arm of the lever rearwardly and consequently the slide 26, forwardly, and the fingers 30 at their limits of movement toward each other, approximately as shown in Fig. 7.

Suitable means are provided to act against this spring device to open the grasping fingers and to control the position thereof. For instance, I show an upright cam track or wedge 36, fixed on the column 1, for this purpose, and engaged by the roll 33, of the lever 32. It will be noted that the track 36 is in a fixed position, while the bracket 19, and the centering device move vertically with the bottle table, and hence the high portion of the track is arranged at the lower end thereof and is engaged by the roll 33, when the bottle table is in its normal depressed position, to depress the spring and hold the lever 32, in position with the slide 26 at its limit of rearward movement and the grasping fingers held in opened position to permit the proper seating of a bottle on the table. The cam track gradually recedes upwardly and rearwardly from its lower end (see Fig. 9) so that as the table moves up on its operative stroke, the roll in following the track will permit the spring to expand and exert its power in closing the fingers around and against the bottle, as hereinbefore described. The track determines the extreme opening and closing limits of the fingers, and the spring provides a yielding power by which the fingers are caused to grasp and hold the bottle to avoid damage thereto and to permit the fingers to grasp and hold bottle necks of different shapes and diameters within the extreme limits of movement of the fingers. When the fingers are grasping a comparatively large bottle neck, as in Fig. 6, the spring will be thereby held compressed to such an extent that the roll 33, will be held forward from engagement with the low portion of track 36, but when the fingers are grasping a smaller bottle neck as in Fig. 7, the spring will be permitted to expand to a greater extent and the roll 33, will hence engage the track for a greater portion of its length. The bottle neck limits the expansion of the spring and hence bottle necks of various sizes can be accommodated, grasped, and brought into proper alinement with the center longitudinal axis of the machine head.

In the particular example illustrated, the head of the machine comprises a vertical elongated fixed tubular shaft or member 37, spaced from and parallel with the upper portion of the column 1, and arranged above and having its longitudinal axis alined with the central vertical axis of the bottle table. This head 37 is supported by a bracket 38, embracing and adjustably clamped on the upper end of the column and formed with a pair of laterally projecting arms 39, having alined vertical bores receiving the head. The head is locked in the upper arm by a nut 40, adjustable vertically on the projecting threaded upper end of the head, into engagement with the upper side of the arm to draw a shoulder of the head tightly against the under side of the arm. The head fits snugly in and extends through and depends below a bushing or sleeve 41, fitted and tightly clamped in the bore of the lower arm 39, and at its lower end bearing against an annular exterior shoulder of the head. This sleeve depends a distance below the lower arm and at its lower end is formed with an annular external enlargement 42, to uphold the rotary head or pulley of the spinning device that is mounted to rotate on and is carried by the sleeve 41. The elongated vertical hub 43, of this pulley is centered and rotates on the sleeve and is upheld by a suitable bearing, such as a ball bearing 44, between the lower end of the pulley hub and the enlargement 42, of the sleeve (see Fig. 5). The construction and operation of this spinning device will be hereinafter described.

A cap tube 45 is arranged centrally within and extends approximately throughout the length of the head 37, and is supported by any suitable means in a fixed position within said head. The upper end of the head is closed except for a cap receiving opening 46, registering with the otherwise open upper end of the tube for the passage of properly positioned caps into the tube.

The caps (b') are usually of stiff sheet metal with a cylindrical depending flange and an internal disk of compressible sealing material. The opening 46, and the cap tube are formed to receive and permit passage of caps when arranged on edge or in a vertical edgewise position and the tube is formed to maintain the caps in such position. The caps are similarly arranged in the tube in a column, one resting on the other with their edges abutting, and with their flanges all projecting in the same direction. The caps feed down through the tube by gravity as the caps are removed one at a time from the lower end of the tube.

With particular reference to the illustrations appearing on Sheets 3 and 6, of the drawings, it will be noted that the lower end of the cap tube terminates within the bore of the head a distance above the lower open end of the head, and that means are provided within the head to receive the bottom cap from the tube and to finally present the same in a horizontal position with its flange depending (the open side of the cap down) in position to receive the mouth of the bottle, and that while this is going on the column of caps remaining in the cap tube is upheld after said column has dropped in the tube a distance equal to the diameter of the cap removed from the lower end thereof.

Figure 2:
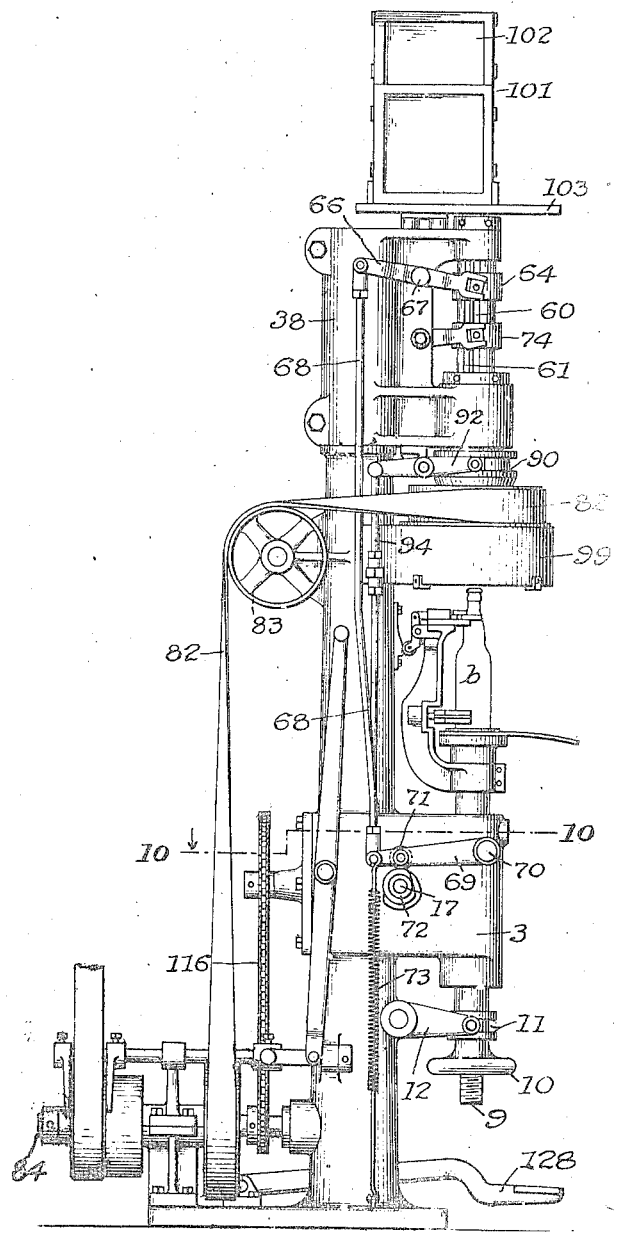
Fig. 2, is a side elevation showing the left hand side of the machine, Fig. 1, a bottle being shown on the table, the operating parts being in the same position as in Fig. 1.
Figure 1:
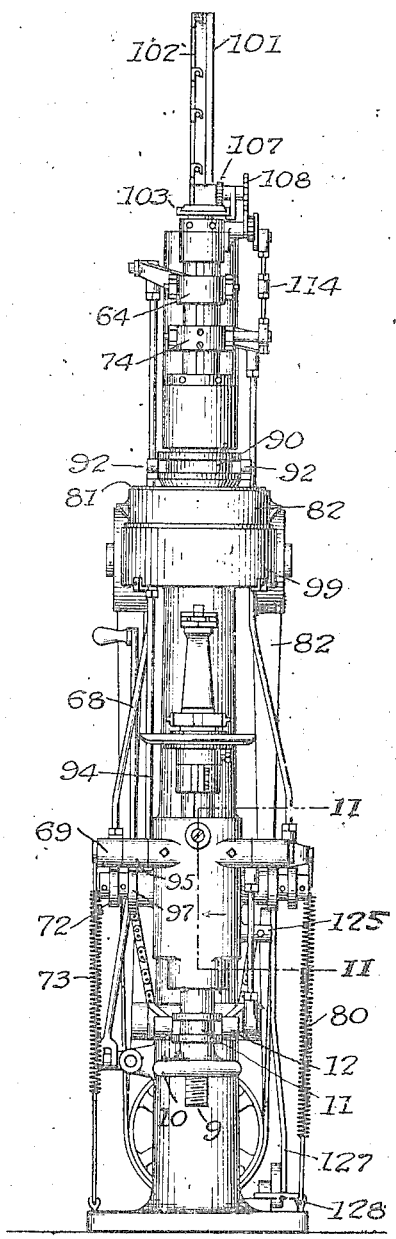
Figure 1, is a front elevation of a machine embodying my invention, the operating parts thereof being shown in their normal positions.
Figure 22:
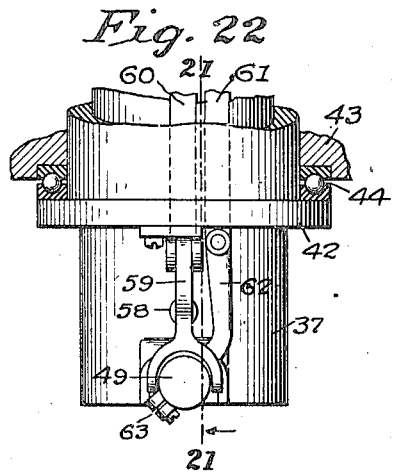
Fig. 22, is a detail elevation of the lower portion of the machine head, the spinning device not being shown except for a fragment of the pulley thereof appearing in vertical section.
Figure 21:
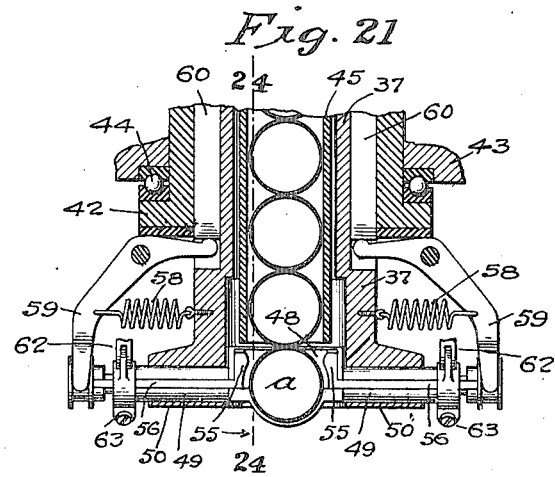
Fig. 21, is a detail vertical section on the line 21—21, Fig. 22.
Figure 23:
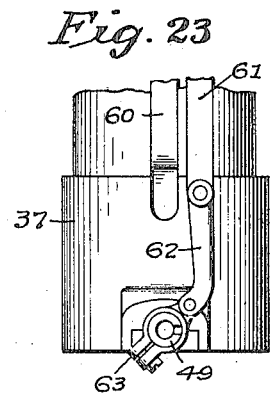
Fig. 23, is a detail elevation of the lower portion of the head, with the spinning head or pulley carrying bearing sleeve removed, and also with the grooved head and shank of one of the cap clamps or jaws of the cap turn-over chuck removed.

In the particular examples illustrated by said sheets of the drawings, a cap turnover and holding chuck is provided to perform the just mentioned functions, as well as to form a backing or platen for the cap to withstand the upward pressure of the bottle mouth thereon in compressing the sealing disk in the cap while the cap is being spun on the bottle. This particular rocking chuck comprises a strong metal block or body 48, extending diametrically across the bore of the head 37, just below the lower open end of the cap tube, and at its ends provided with alined trunnions 49, integral therewith and mounted in alined bearing sockets in the lower end of the head which are closed at their otherwise open sides by plates 50, removably secured to the bottom end face of the head (see Figs. 21 and 29). One side of this block 48 is formed with a transversely arranged flat cap seat or socket 51, at one end (its lower end) closed by a shoulder 52, arranged along one longitudinal edge of the block and at the other end (the upper end) open or unobstructed so that when the block is in a certain position, the bottom cap in the tube can slide onto the block through said open end and will be held on the block and resting in said seat by the engagement of the lower edge of the cap with the shoulder 52 (see Fig. 24).

The block 48, is radially enlarged and its back 53, is convexed or transversely curved concentrically with the axis on which the block rocks, to close the otherwise open lower end of the cap tube and to uphold the caps therein when the block has rocked from its normal position.

The block 48, is rockable, through an arc of something in excess of ninety degrees but less than one hundred and eighty degrees, to and from its normal position with the flat seat 51, in an upwardly inclined position at the upper side of the block and below the cap tube (Fig. 24), and its cap-delivering and backing position (Fig. 26) wherein the seat is at the under side of the block and is in a horizontal position.

When the block is in normal position (Figs. 21, 24) the bottom cap of the column of caps upholds the caps in the tube and is itself upheld by the shoulder 52, of the block, and this cap assumes a downwardly and laterally inclined position with its closed end resting down against the seat 51, and its upper edge just clear of the lower edge of the cap tube.

The bottom cap when slipping from the lower end of the tube onto the seat of the block is guided and confined to proper position on the seat, by a laterally yielding spring finger 54, depending from the exterior of the cap tube to which it is secured, with its free end arranged within the bore of the head and opposite and spaced from the cap seat when the block is in normal position.

A pair of cap gripping jaws 55, is arranged in and longitudinally movable of the block. The jaws are arranged at opposite ends of the seat 51, and the shoulder 52, so that the cap received from the cap tube drops onto the seat between and is guided and centered by these jaws, which are simultaneously movable in opposite directions, i. e., away from each other to permit free passage of the cap onto the seat and between the jaws, and then are moved toward each other to engage the flange of the cap and hold the cap to the seat while the block is turning over and presenting the cap in position to receive the bottle mouth.

The jaws 55, are rigid with shanks or slide rods 56, longitudinally movable in grooves in the trunnions 49, and beyond the ends of the trunnions said shanks 56, are provided with annularly grooved heads 57, to receive the means by which the jaws are actuated (see Sheet 6). In the example illustrated, the jaws 55, are actuated in their cap gripping movements by distended coiled retractile springs 58, through the medium of elbow levers 59, having depending forked ends loosely fitting in the grooves of heads 57. These levers are arranged diametrically opposite each other at the exterior of the head to which they are pivoted on transverse fulcrums from which the upper arms of the levers extend inwardly with respect to the head with their inner extremities entering longitudinal grooves in diametrically opposite portions of the head and bearing upwardly against the lower ends of slide rods 60, longitudinally movable in said grooves. The positions of the jaws 55, are controlled by those slide rods 60, for when the slide rods are depressed the levers 59, are rocked against the tension of springs 58, to withdraw the jaws from clamping position, and when the slide bars are elevated, the springs 58 swing the levers to press the jaws inwardly to grasp the cap with a yielding spring pressure.

The turn-over chuck (comprising the block and the spring actuated jaws) is rocked to and from cap-receiving and cap-delivering positions, by suitable operating connections including slide bars 61, slidable vertically in longitudinal grooves in the head and at their lower ends pivotally joined to the upper ends of links 62, which at their lower ends are pivotally joined to radially projecting portions of sleeves 63, clamped on the projecting outer ends of the trunnions 49. The slide bars 60, controlling the spring actuated jaws 56, of the turn-over chuck are normally depressed to hold said jaws in their normal withdrawn positions (Fig. 21) and these bars are controlled in their vertical movements and are coupled together by a collar 64, (see Fig. 17) arranged and slidable vertically on the exterior of the machine head between the frame arms 39. This collar is provided with radiating trunnions 65, by which the slotted ends of the arms of a forked lever 66, are pivotally coupled to the collar to raise and lower and control the vertical movement of the collar. This lever 66, is vertically swingable on a fulcrum 67, by which the lever is pivotally mounted on the main frame bracket 38. This lever is actuated by a push and pull link 68, at its upper end pivotally joined to the normally elevated rear free end of the lever 66, and at its lower end pivotally joined to the free rear end of a horizontally disposed vertically swingable lever 69, at its front end fulcrumed at 70, to the knee 3, and intermediate its length provided with a roller 71, bearing down on the top edge of a cam 72, fixed on the rotary cam shaft 17. The cam edge determines the vertical position of the lever 69, through the medium of the roller 71, and the lever 69, and its roller 71, are yieldingly held to their limits of downward movement (determined by cam 72) by a distended retractive coiled spring 73, attached to the free end of lever 69, and to the machine frame or base.

The cam 72, is formed so that its high portion will normally hold the lever 69, and the rear end of lever 66, elevated and the slide bars 60, in their normal depressed position, while the low portion of the cam is formed to permit the spring 73, to depress lever 69, and the rear end of lever 66, to elevate slide bars 60, at the proper time to cause jaws 55, to grip the cap in the chuck in the necessary sequence with respect to the operation of other parts of the apparatus.

The slide bars 61, are normally at their limits of upward movement, to hold the chuck in its normal position (Figs. 21 to 24) and these bars 61, are connected together and are controlled and actuated by a collar 74, slidable on the upper part of the head 37, and provided with trunnions and secured to the bars 61, approximately as shown by Fig. 17, with reference to bars 60, and their collar 64.

The collar 74, is normally at its limit of upward movement and is moved vertically by a vertically rockable lever 75 fulcrumed to bracket 38, and having its normally elevated front forked end pivotally coupled to said collar 74. The normally depressed rear end of lever 75, is pivotally joined to the upper end of push and pull rod or link 76, the lower end of which is pivotally joined to the rear free end of a horizontally disposed vertically swingable lever 77, fulcrumed at its front end to knee 3. This lever 77, is provided with a roller 78, bearing down on the top edge of cam 79, fixed to rotary cam shaft 17. The lever is held down with its roller against the cam to follow the same by a spring 80.

The spring 80, acts to return the collar 74, and the chuck to normal positions and to maintain the same in such positions while the roller 78, is engaging the low portion of the cam 79, while the high portion of the cam 79, serves to depress the collar 74, to actuate the intermediate parts to rock the chuck on its turn-over movement and to hold the chuck in its turned over or cap delivering position, all in proper sequence with respect to the movements of other parts of the apparatus.

In the example illustrated, the spinning mechanism comprises a horizontally rotating pulley 81, concentric with the head 37 and supported by the sleeve 41, in which said head is centered. This pulley 81 (or other suitable rotary head) consists of the vertically elongated hub 43, from the lower end of which the body or web of the pulley extends horizontally and radially to join the pulley rim to the hub. The pulley rim is shown in the form of a vertical annular flange rising from the web and at its lower end provided with an outwardly projecting continuous belt supporting flange, all as clearly illustrated particularly by Figs. 5, 18, 19, and 30.

The spinning head can be constantly rotated in one direction at the desired speed by any suitable means, although in the drawings, I show the same driven by an endless friction belt 82, engaging the front side of the pulley rim of the head, and having its opposite plies extending horizontally and rearwardly at opposite sides of the column 1, to a couple of vertically-rotating idler pulleys 83, carried by and arranged in rear of the column from which the belt depends to a belt driving pulley on the horizontal main drive shaft 84, of the machine extending rearwardly from the column and suitably supported by the machine base and provided with any suitable driving connection, such as driven pulleys and a driving belt from any suitable source of power.

The web of the rotary spinning head 81, carries suitable spinning or curling tools or other elements adapted to engage and spin or turn the depending flange of the cap $a$, located on the mouth of the bottle $b$, inwardly (see $d$, Fig. 47) under the exterior shoulder $c$, of the bottle mouth, to lock the cap tightly on the bottle mouth, while the bottle and cap are held under pressure between the bottle table and the cap turn-over chuck.

As an example of means that I employ for this purpose, I show several uniformly spaced parallel vertical rock shafts or spindles 85, parallel with and spaced equal distances radially from the longitudinal axis of the head 37, and mounted to rock in and extending above and below the web of the pulley 81, and at their lower ends provided with laterally extending arms 86, at their free ends carrying rotary spinning or curling tools or rolls 87, (Fig. 19) while the upper ends of said spindles 85, are provided with lateral arms 88, having beveled ends 89, yieldingly pressed inwardly against a cone 90, by expansion springs 91 (Fig. 18). The spindles 85, are mounted in suitable bearings extending through the web of pulley 81, and arranged between the hub and rim thereof so that the arms 88, extending radially from the upper ends of the spindles are located within said rim, and the springs 91, are compressed between the rim and the free ends of said arms.

The arms 86, are preferably provided with clamping hubs by which they are rigidly yet adjustably clamped to the lower ends of the spindles 85. The arms extend radially and inwardly from the spindles and their free ends are preferably curved laterally and the curling rolls 87, are mounted to rotate on vertical axes rising from the free inner ends of said arms. The free ends of the arms are so arranged that the rolls revolve in a common horizontal plane and in a circular path arranged concentrically within the circular path in which spindles 85, revolve, and the diameter of the circle of travel in which said rolls revolve is increased and diminished by swinging arms 88, and rocking spindles 85. Thus when the arms 88, move inwardly under the power of their springs 91, the arms 86, swing outwardly and increase the diameter of the circle in which the spinning rolls travel, while when the cone forces the arms 88, outwardly the arms 86, swing inwardly and the spinning rolls approach each other and reduce the diameter of the circle in which they travel.

The upper ends of the spinning rolls are arranged immediately under and quite close to the bottom face of the head 37, and the circle in which said rolls travel is normally of a slightly greater diameter than that of the caps $a$.

The cap-engaging-edges of the rolls travel in the horizontal plane of the lower edge portion of the depending flanges of cap $a$, when said caps are held in the turned over or inverted cap chuck and on the bottle mouth, as shown by Fig. 26.

The spinning rolls thus travel in their normal circle of enlarged diameter with respect to the cap diameter, until the cap holding chuck has assumed reversed position and the bottle mouth has been inserted in the cap thus held and is compressing the seal in the cap. While the cap and bottle mouth are in this position and condition, the cone 90, descends and the arms 86, swing toward each other to bring the spinning rolls into curling or spinning engagement with the depending flange. The rapidly rotating rolls quickly turn the lower edge of the cap flange inwardly to the desired extent and then withdraw outwardly. The movement in this respect being very slight and exceedingly rapid, almost momentary.

In the example illustrated, the cone 90, is mounted in vertical sliding adjustment on the exterior of the upper portion of the hub 43, of the rotary spinning device head or pulley, and is formed with an annular groove loosely receiving the forked end of a vertically swingable lever 92, by which the cone is raised and lowered.

The lever 92 is vertically rockable on a fulcrum 93, carried by the frame bracket 38, and said lever is swung in proper sequence with other moving parts of the machine, by a link or rod 94, at its upper end pivotally joined to the rear end of lever 92, and at its lower end pivotally joined to the rear end of a vertically swingable lever 95, having a roller 96, held down on the top edge of a cam 97, fast on the cam shaft 17.

The cone 90, is normally at its limit of upward movement and hence the roll 96 of lever 95, is normally engaging the low portion of rotary cam 97, and it is only when the comparatively short high portion of said cam engages and lifts roll 96, that the cone is depressed and the curling or spinning rolls are brought into operative engagement with a cap.

The lower end of the machine head and the portions of the spinning or curling mechanism located below the pulley 81 are inclosed within a box, guard or housing 99, fixed to and extending forwardly from the column 1, and this housing is closed at the bottom, above the bottle table, except for a restricted vertical opening or hole 100, alined with the longitudinal axis of the machine head, for the upward passage of the bottle mouth to the cap receiving position and for the downward passage of the capped bottle mouth from said position.

Any suitable means can be provided for maintaining a supply of caps in the head of the machine or in the tube extending through said head, although certain features of my invention are not limited to a cap feeding mechanism but contemplate a capping machine wherein the caps can be automatically fed and placed on the bottle mouths preparatory to the spinning operation. In the particular examples illustrated, I show means for carrying a series or plurality of parallel vertical rows of properly positioned caps, arranged to permit the caps of a row to drop one at a time by gravity through slots 46 into the cap tube, and to bring a fresh row of caps over slot 46, as the preceding row is exhausted. For instance, I show a vertically arranged rectangular holder or box 101, having a removable side wall 102, and an open bottom closed by an elongated horizontal plate, floor or slideway 103, supporting said holder and on which the same is longitudinally slidable and to which it is confined by suitable guides. The horizontal plate 103 is fixed to the machine frame bracket 38, and extends across the upper end of head 37, and the slot 46, alined with the cap tube in said head, is also alined with an upwardly flaring vertical slot 104, opening through said plate and into the open lower end of said box or holder.

The holder is adapted to receive a carton 105, either through its side on the removal of wall 102, or through its top. The carton shown is composed of a plurality of parallel closely-arranged similar paper material tubes pasted or otherwise permanently secured together at their longitudinal sides.

Each paper tube is of a cross sectional formation conforming approximately to the cap tube 45, to receive and maintain a row of edgewise arranged caps resting one on the other the same as the caps in tube 45.

For instance, in the particular example illustrated, each tube of the paper carton contains a column of twelve caps and the carton is composed or made up of eighteen of such connected tubes. These paper tubes are uniform in length, open at the ends and arranged side by side, and can be formed by partitions in a paper or other material box or by pasting together previously formed individual tubes. The cartons can be filled with caps at the place where the caps are manufactured, and can be kept in stock for use as needed in capping machines. The caps can be packed in the cartons for shipment when necessary, and if so desired, the ends of the cartons can be temporarily closed to retain the caps in the tubes by suitable removable strips as indicated by dotted lines Fig. 20.

In preparing the capping machine for use, the tube 45, is filled with caps through the entrance slot 104, 46, the caps being all arranged with their closed ends toward the front and their flanges extending rearwardly, and the same arrangement of caps is necessarily followed in filling the tubes of the carton, so that one end of the carton is the front end and should be so designated or indicated and said front end should be arranged over the slot 104, when the loaded carton is inserted in the holder 101. The holder is pushed back to the rear end of plate or slideway 103, and the carton fitted therein with the columns of caps therein resting on and upheld by the plate 103, and with the front column alined with the slot 104 through which the caps thereof can drop in initially filling tube 45, or said tube can be filled by hand before the loaded carton is placed in the holder. When the tube 45, is being filled, the first cap drops therethrough and into the turn-over chuck occupying the cap seat thereof, see Fig. 5. The remaining caps filling the tube 45, as well as the column of caps in the tube of the carton alined therewith, are upheld by said cap in the chuck, and by the convexed back 53, of the chuck when the chuck turns over to present its cap in bottle receiving position. After the cap has been applied to the bottle and the empty chuck returns to normal upright position, another cap from tube 45, drops thereinto and thereupon the alined caps in the tube and carton drop down a distance equal to the diameter of a cap. When the tube of the carton is emptied suitable means move the carton forward the width of a cap to bring the next column of tubes therein in alinement with slot 104. The carton is thus moved forward step by step until all of the caps have been fed therefrom, the holder is then pushed back to its starting point, the empty carton is removed, and a loaded carton is inserted and the holder again starts on its forward feeding movement. Suitable means are provided to thus automatically feed the carton holder forward and such means embody counting mechanism to properly time the forward feeding movements of the carton holder. As an example of means that can be utilized for feeding the carton holder on its forward strokes, I show a rack 106, rigid with and arranged longitudinally of the carton holder and in mesh with a pinion 107, fixed on a short rotary shaft mounted in a bracket fixed to plate 103, and at its outer end having a star wheel 108, fixed thereto.

The wheel 108 is periodically actuated a partial revolution by the radial finger 109, fixed to and projecting from a ratchet wheel 110, loosely mounted on a bracket 111, fixed to and projecting laterally from the upper arm 39 of the frame bracket 38. The ratchet wheel 110 is actuated a notch or tooth at a time by pawl 112, pivotally mounted on rocker 113, loosely mounted on bracket 111, concentric with the ratchet wheel and pivotally connected with collar 74, through the medium of link 114. The collar 74, controls the cap holding jaws of the cap turn-over chuck and every time a cap is discharged from the cap tube 45, and applied to a bottle said collar 74, moves down and then up to its normal position.

When the collar 74, moves down, it swings rocker 113, in a direction to cause the pawl 112, to partially rotate the ratchet wheel 110, a distance equal to one tooth of said wheel. When the collar 74 returns to normal position the rocker moves in the opposite direction and the pawl slips back over the next tooth to position to again feed the ratchet wheel forward a tooth. Every time a cap is removed from the cap tube (consequently from the carton) the ratchet wheel is fed forward a tooth. The finger 109, rotates with the ratchet wheel and operatively engages the star wheel once during every complete revolution of the ratchet wheel. The finger is arranged to partially rotate the star wheel, once during each rotation of the ratchet wheel, a distance equal to one tooth of the star wheel to move the carton holder forward (through the medium of the rack and pinion) a distance equal to the spacing between the rows of tubes in the carton and thereby moves the carton forward to carry an empty tube thereof beyond slot 104, and to bring the next tube into alinement therewith. In the particular example illustrated, each carton tube contains twelve caps when full, hence the ratchet wheel 110, is formed with twelve teeth, and the finger 109, moves the star wheel the distance necessary to feed the carton holder forward to bring a fresh tube over slot 104, every time twelve cap delivering operations have been completed, i. e., each time that twelve caps have been delivered from the head of the machine. When the carton holder has been moved forward to its limit of forward movement to feed all caps therefrom, the feeding and counting mechanism permits the holder to be freely pushed back by hand to its starting point, and said mechanism can then be adjusted if necessary to set the finger 109, at the proper starting point with respect to the star wheel, so as to actuate said wheel when the first twelve caps have been delivered.

The operating parts of the machine are actuated through the medium of the cam shaft 17, with the exception of the spinning head 81, which is constantly rotated during the operation of the machine by the endless belt from the main drive shaft. Means are provided to operate the cam shaft a single rotation on each bottle capping operation, and then bring the same to rest. Various means can be employed for this purpose, although I prefer to employ a clutch for operatively connecting the cam shaft with the operating power, for a complete rotation of said shaft, and for automatically disconnecting the shaft and power on the completion of a single rotation of the shaft. I also provide manually operated means for throwing the clutch into action.

In the example illustrated, the cam shaft 17, is mounted in the knee 3, of the frame and extends transversely therethrough and the cams hereinbefore described are fixed on the projecting ends thereof. A counter shaft 115, is mounted in the knee and projects rearwardly therefrom and is constantly driven by the main shaft 84, through the medium of a sprocket chain 116, or other suitable transmission.

Within the hollow knee the countershaft is provided with a bevel pinion 117, constantly driving a bevel gear 118, loose on the cam shaft 17. The main clutch hereinbefore referred to throws the constantly rotating gear 118, into and from driving connection with the cam shaft 17, and this clutch comprises a hub 119, fixed on the cam shaft beside the loose gear 118, and provided with a longitudinally slidable clutch pin 120, on which a coiled spring 121, is constantly acting to project the pin into locking engagement with the gear 118. The gear 118 is formed with an annular series of uniformly spaced beveled edge sockets 122, to receive the end of said pin and thereby lock the gear 118 to rotate with the cam shaft. The pin is provided with a laterally projecting beveled heel 123, exposed at the exterior of the hub 119. The clutch pin is withdrawn and released by a beveled end clutch lever or trip arm 124, fixed to and projecting laterally from a rock shaft 125.

At the exterior of the knee the shaft 125, is provided with a lateral arm 126, connected by upright link 127 with a vertically-swingable treadle 128, mounted on the base of the machine.

The trip arm 124, constantly tends to remain in and return to its normal position (Figs. 11, 12 and 13) with its beveled end engaging the heel 123, of the clutch pin and holding said pin withdrawn, against the tension of its spring, from operative engagement with the gear 118, so that said gear revolves freely independently of the cam shaft. When the treadle is depressed, the arm 124, is swung from operative engagement with the heel of the clutch pin, and said pin under the action of its spring moves into operative engagement with the gear 118, and enters one of the sockets 122, and thereby locks the cam shaft to revolve with said gear. The cam shaft makes one revolution and the heel 123 of the pin thereupon engages the beveled end of the trip arm (which in the meantime has returned to normal position) and is thereby withdrawn from operative engagement with the gear 118, and the cam shaft hence comes to rest.

In operation, the bottle, jar or other receptacle to be capped, is placed on the table against the V-stop or body positioner 20, with the neck of the bottle between the open fingers 30, of the bottle neck holding and centering device. The treadle is thereupon depressed and released, and the cam shaft starts on its single revolution to rotate each cam 16, 79, 72, and 97, a complete revolution.

When the cam shaft starts on its rotation, the cam 16, starts to elevate the bottle table. As soon as the table starts on its operative stroke, the cam track 36, permits the fingers 30, to swing in to grasp the bottle neck and accurately aline the same with the opening 100, in housing 99.

The cam 79 also causes the cap chuck operating devices to rotate or rock the chuck from normal upright position to reversed horizontal position holding the cap reversed to receive the advancing bottle mouth.

As soon as the chuck begins to rock on its reversing movement, the cam 72, causes the operation of the chuck jaw actuating means to move the two jaws 55, inwardly to grasp the cap in the chuck and hold the same from falling from the chuck while the chuck is turning and after the chuck has assumed the reversed position and come to rest to permit the bottle mouth to enter the cap and compress the sealing material in the cap.

As soon as the table has reached its limit of upward stroke and is holding the bottle mouth against the sealing disk in the cap to produce the desired compression thereof, the cam 97, causes the curling or spinning rolls 87, to close in against the lower edge portion of the flange of the cap thus held in the bottle mouth, and curl, spin or turn said edge under the bottle shoulder to lock the cap on the bottle, see Fig. 47.

It requires but an instant for the rolls 87 to spin the cap on the bottle mouth and then withdraw, and the table thereupon starts on its return movement and the hereinbefore mentioned cams cause the various other parts to all return to normal positions before the cam shaft completes its revolution and comes to rest.

On the upward movement of the table, approximately the instant the bottle mouth engages the sealing disk in the cap, the chuck jaws 55, move outwardly away from the cap, so that the cap can freely move down from the chuck with the bottle after the completion of the spinning operation. As soon as the capped bottle starts on its return movement, the chuck begins to turn to its normal upright movement, and as it reaches normal position, the lower end of the cap tube is uncovered and a cap drops therefrom into the chuck.

By the time the bottle table drops to normal position, the other cam-controlled moving parts have returned to their normal positions, and the cam shaft has completed its revolution and come to rest.

The modification illustrated by Figs. 30 to 46, concerns the means for handling the caps in the lower end of the machine head 37, and delivering the same to the bottle mouth, and the controlling means therefor, the machine being otherwise the same as hereinbefore described.

In this modification, the lower cap drops from the open end of the cap tube 45, into a turn-over chuck, which drops the cap in a horizontal position, with the open side of the cap down onto a pair of slides or plates, which then separate or move apart and deposit the cap on a pair of movable fingers 70 and said plates then close together over the cap to form the platen or abutment therefor while the bottle mouth is entering the same and compressing the sealing disk therein and while the cap is being spun on the bottle by the spinning devices hereinbefore described.

The turn-over chuck of this modification does not support the column of caps in the tube 45, and hence a vertically disposed elongated double pointed or escapement dog is provided and operative through a slot in the edge of the lower portion of the tube to control the column of caps therein, and to permit the bottom cap to drop at the proper instance into the turn-over chuck in the head below the tube. This dog has a central outwardly extending arm 129, joined by a transverse pivot to a slide rod 130, arranged longitudinally of the head 37, and at its upper end secured to a normally elevated vertically slidable collar 131, on the exterior of the head and raised and lowered by a lever 132, connected and operated by a depending link 133, extending to a lever (not shown) controlled by a suitable cam on the cam shaft.

This dog is normally in elevated position as shown by Fig. 34, with its upper arm 134, projected into the cap tube and holding the column of caps elevated. The dog is forced into this position when the slide bar 130, moves up from depressed position by a transverse pin 135, fixed in the head.

When the slide bar 130, moves down, the dog moves down with it and the lower arm 136, of the dog is directed into the lower end of the tube, to catch and uphold the column of caps released by the withdrawal of the upper arm of the dog, by a transverse pin 137, fixed in the head. Then when the slide bar 130, returns on its up stroke, it moves the dog bodily upwardly and at the same time the dog rocks to permit the lower cap to drop into the cap chuck and to throw the upper arm of the dog inwardly under the next cap above to uphold and elevate the column of caps as shown by Fig. 34.

In this modification, the cap turn-over chuck is composed of two separate similar members that perform the cap holding and reversing functions of the block 48 and its jaws 55, of the preferred construction.

The turn-over chuck of the modification comprises a pair of similar alined rockable or rotatable sleeves or hubs 138, mounted to rock in diametrically opposite bearings extending through the lower portion of the head and held against longitudinal movement therein. The projecting outer ends of these hubs having lateral arms 139, clamped thereto and connected by links 140, to slide bars 130 arranged longitudinally of the head and secured to collar 131, for rocking the hubs, all as described in connection with the means for rocking the chuck in the preferred construction. These hubs are also provided with stripping plates 142, fixed thereto and projecting longitudinally therefrom into the bore of the machine head. Each rockable hub has a shaft 143, extending longitudinally and projecting beyond the inner and outer ends thereof and rotatable therewith but longitudinally movable therethrough. The inner end of each shaft carries a cap jaw 144, forming one half of the cap holder or chuck.

Each jaw is open at its inner side and upper end, and is slotted to receive the stripper 142, which serves to hold the shafts and jaws to rotate with the hubs. When the shafts are at their limits of inward movement their jaws coöperate to form the chuck and hold the cap. When the shafts move outwardly the jaws move apart to release and drop the cap held thereby while the strippers serve to prevent the cap sticking in either jaw and cause it to drop centrally from and between the jaws.

The outer ends of the shafts 143, are provided with annularly grooved heads 145, to receive spring-held vertically-rockable elbow levers 146, by which the shafts are moved in and out to hold and release the caps. These elbow levers are controlled by slide bars 147, operated by a collar 148, and lever 149, the same as the cap jaws 55 of the preferred construction. The lever 149, is operatively connected by link 150, with a lever controlled by a cam on the cam shaft, not shown by Sheets 7, 8 and 9.

The chuck 144, drops each cap in a horizontal position into a cap guiding and centering throat ring 151, secured in the lower end of the bore of the machine head 37, and said cap drops onto a shutter or trap consisting of a pair of alined horizontally arranged oppositely movable slides or flat plates 152, confined in suitable alined radial slideways at the under side of said throat ring and at the lower end of the machine head. These plates project at the exterior of the head and are simultaneously moved in opposite directions by vertically rockable spring pressed elbow levers 153, which are rocked to force the plates inwardly by slide bars 154, connected and operated by a collar 155, slidable on the head and operated by lever 156, connected to a lever controlled by a cam on the cam shaft. The shutter 152, drops the cap received from the chuck onto a pair of diametrically opposite small swing toes or fingers 156, (Figs. 43, and 44) carried by rock shafts 157, mounted in the lower end of the head and at their projecting ends having crank arms 158, pivotally joined by links 159, to slide bars 160, arranged longitudinally of the head and connected and moved up and down by an exterior collar 161, on the head operated by lever 162, connected to a lever controlled by a cam on the cam shaft.

The cams or other primary operating and controlling means for the chuck, shutter, and final cap releasing fingers are so arranged that the normal positions of these parts when the machine is at rest, will be as appear in Figs. 34, and 35, with the chuck in vertical position holding a cap vertically just as received from the cap tube, with the shutter plates 152, withdrawn or separated, and with the fingers 156, in operative position maintaining a properly positioned and centered cap suspended from the head below the open lower end of the bore of the head. The lower edge of the short inflange of this cap rests on the short inturned edges of these fingers. Then when a bottle has been placed on the table and the main clutch has been thrown in to cause the machine to perform a cap feeding, cap applying and compressing and spinning operation, as the table starts on its operative stroke, the shutter plates 152 are brought together over and backing the cap upheld by fingers (Figs. 36, 37, 45 and 46), the cap being then received in a recess 152', in the under sides of the shutter. The chuck is also rocked to turn the cap over to a horizontal position with its open side down, and the shafts 143, are then drawn outwardly to separate the chuck jaws so that the strippers cause the cap to fall therefrom through the centering throat ring onto the upper side of the closed shutter (Figs. 36 and 37) and at the same time the dog has permitted the column of caps to drop to the position shown by Figs. 36 and 37. While this is going on the bottle mouth enters the cap backed by the shutter and while applying the sealing pressure thereto the spinning tools lock the cap on the bottle mouth, but just before the bottle mouth actually enters the cap the shafts 157, are rocked to quickly swing the fingers outwardly and upwardly from the cap to the position shown by Fig. 36. Before the cam shaft completes its revolution, the chuck is returned to vertical position and the jaws thereof return to cap receiving position and a cap is dropped thereinto as the dog moves up to normal position, the final cap releasing fingers 156 swing down and into operative normal position, and the shutter plates then withdraw to normal open position and drop the cap previously deposited on the shutter, onto the fingers in readiness to receive a bottle on the next operation of the machine.

I have in the preceding description explained numerous details, combinations and arrangements to which my invention is not limited, and it is obvious that various changes, modifications, and variations might be resorted to, that parts and features might be omitted, and that other elements and combinations might be added, without departing from the spirit and scope of my invention and hence I do not wish to limit myself to the disclosures hereof.

Desiring to protect my invention as broadly as is legally possible, what I claim is:—

1. A machine for automatically applying flanged caps to receptacle mouths and spinning or curling the same thereon comprising a rotary cap spinning or curling device, means for bringing the cap and receptacle together in a direction alined with the axis of rotation of said device, and mechanism for automatically and vertically feeding the caps along a path alined with said axis of rotation and for successively presenting the caps for application to such receptacles.

2. A bottle capping machine provided with a head having a cap feeding passage extending longitudinally and centrally therethrough, said machine provided with a cap holder at the lower end of said head and in line with the longitudinal axis thereof to hold the cap while receiving a bottle mouth, and means for locking the cap on the bottle mouth while said cap is alined with said axis of the head.

3. A machine for locking caps on bottles, comprising a head forming the longitudinal axis of the machine and provided with a cap passage extending longitudinally therethrough approximately in line with said axis, means to hold the bottle to be capped approximately alined with said axis during the capping operation, rotary means concentric with said axis for locking the caps on the bottles, and means for successively receiving caps from said passage and presenting and maintaining them at the capping position.

4. A machine for applying stiff metal flanged caps to bottle mouths and for locking the flanges of such caps under exterior shoulders of the bottle mouths, comprising a longitudinal member forming the head of the machine and having a straight cap passage extending throughout the length thereof and longitudinally therethrough, means extending below the lower end of said member for locking the caps on the bottle mouths, means for maintaining the bottle with its mouth below said member and alined with said passage during the capping operation, and means for successively receiving the caps from said passage and presenting them at the capping position.

5. A machine for applying stiff metal flanged caps to bottle mouths and for turning the flanges thereof under the exterior shoulders of the bottle mouths, comprising a vertically elongated head having a cap passage extending centrally and longitudinally therethrough, means for sustaining a column of caps in said passage and for successively removing the caps from the lower end thereof and presenting the same at the capping position embodying a cap chuck carried by said head to sustain the sealing pressure, and means for turning the cap flanges under the bottle mouth shoulders.

6. A bottle capping machine comprising a longitudinally elongated tubular member forming the machine head and having a cap passage extending longitudinally therethrough, means carried by said head to sustain a column of caps in said passage and to successively remove the lower cap therefrom and present and back the same at the capping position at the lower end of the head, rotary means concentric with said head and extending below the same to lock the caps on the bottle mouths, and means to support a bottle at the capping position alined with said head.

7. A bottle capping machine comprising an elongated tubular member, a frame supporting the same in a fixed position, a straight vertical cap tube extending longitudinally through said member, means for feeding caps into the upper end of said tube, means carried by said member for sustaining a column of caps in said tube and for successively removing caps therefrom and presenting and sustaining them at the capping position at the lower end of said member, and means at the lower end of said member for locking the caps on the bottle mouths.

8. A bottle capping machine having a head formed by a vertical tubular member provided with a vertical cap feed passage extending longitudinally therethrough, a rotary device concentric with and extending below said head for locking caps on bottle mouths, and mechanism carried by said head for sustaining a column of caps in said passage and for receiving the bottom cap therefrom and for holding said cap alined with said passage and in bottle mouth-receiving position at the lower end of said head.

9. A bottle capping machine comprising a vertical tubular member having a straight vertical longitudinal feed passage adapted to receive a column of abutting caps movable down through said passage as the bottom cap is removed therefrom, mechanism carried by said member and arranged in the lower end thereof to receive the lower cap from said passage and hold the same at the lower end of the head with its open side down to receive a bottle mouth and to sustain the upward pressure of the bottle mouth thereon, means to lock the cap on the bottle mouth while said cap is under said pressure, and means to hold a bottle alined with said passage.

10. A bottle capping machine comprising a frame, an elongated tubular member held in a fixed position by said frame and having a straight cap passage extending longitudinally therethrough, means to support a bottle in capping position alined with said passage and with its mouth at the lower end of said member, means to lock the caps on the bottle mouths while in capping position, and mechanism carried by said member for sustaining the column of caps in said passage and for successively removing the bottom cap therefrom and holding and backing the same alined with said passage and at the capping position.

11. A machine for applying flanged caps to receptacles comprising a receptacle table movable vertically on its operative upward stroke and on its return stroke, in combination with a vertical longitudinally hollow head arranged above said table, said table provided with means to position a receptacle thereon so that the vertical center axis of its mouth will be alined with the vertical longitudinal axis of said head, said head provided with means at its lower end to hold a cap alined with said receptacle mouth and in position to receive the same, and an automatic cap feed for feeding caps longitudinally through said head to said means.

12. In a receptacle capping machine, in combination, a receptacle table movable upwardly on its operative receptacle sealing stroke and downwardly on its return stroke, a vertically disposed relatively fixed longitudinally hollow head, a cap holder at the lower end of said head to sustain the sealing pressure of the receptacle and to hold the cap in receptacle receiving position, a rotary device centered on said head for locking the cap on the receptacle and an automatic cap feed for feeding the caps longitudinally through said head to said holder.

13. In a receptacle capping machine, in combination, a receptacle table movable upwardly on its operative receptacle sealing stroke and downwardly on its return stroke, a relatively fixed head provided at its lower end with means to hold a cap in a horizontal position to receive the receptacle, and an automatic cap feed arranged to feed caps in a vertical position longitudinally through said head.

14. A receptacle capping machine having a vertically arranged hollow head provided with means for feeding caps therethrough and for successively turning the lower cap.

15. A receptacle capping machine having a head at its lower end provided with a turn-over cap holding and backing chuck, and with a cap tube arranged longitudinally within the head and leading to said chuck and arranged to deliver vertically or edgewise arranged caps thereto, said chuck constructed and arranged to hold the cap positioned to receive the receptacle mouth and to back the cap during the sealing operation.

16. A receptacle capping machine having a head provided with a longitudinal vertical cap passage arranged for the downward movement of edgewise or vertically arranged caps, a turn-over chuck at the lower end of said head adapted to receive caps from said passage and turn the same to horizontal receptacle mouth receiving position and to hold the same in such position until received by the receptacle mouth and to back the same during the application of sealing pressure thereto, and rotating means centered on said head for locking the caps on the receptacle mouths.

17. A receptacle capping machine having a head with a cap feeding passage extending downwardly and centrally therethrough and arranged to receive edgewise arranged caps, and a cap receiving and turn-over chuck arranged at the lower end of said head below said passage.

18. A receptacle capping machine having a head with a cap feeding passage extending downwardly therethrough, and a cap receiving, holding and turn-over chuck arranged to receive caps one at a time from said passage, said chuck formed to sustain a column of caps in said passage and to hold each cap in bottle mouth receiving position and back the same during the application of sealing pressure.

19. A receptacle capping machine having a vertically disposed head with a cap passage extending longitudinally therethrough and open at its upper end to receive edgewise or vertically arranged caps from a source of supply arranged above the head and open at its lower end so that caps can drop therefrom by gravity into the lower portion of the head, and a cap receiving and turn-over chuck arranged at the lower end of the head at the capping position to successively receive the bottom caps and hold and sustain the same in bottle receiving position.

20. A receptacle capping machine having a vertically disposed head with a cap passage extending longitudinally therethrough, means at the lower end of the head to receive caps from said passage and hold the same in receptacle mouth receiving position, and movable means above said head and provided with automatic feeding means, said movable means formed to receive parallel rows of vertical columns of caps adapted to be brought into alinement with said cap passage.

21. A receptacle capping machine having a vertically disposed head with a cap passage extending downwardly therethrough and open at its upper end at the top of the head, a movable receptacle above said head and communicating with the open upper end of said passage, and automatic feeding means for moving said receptacle transversely of the longitudinal axis of said passage, said receptacle constructed and arranged to receive a row of vertical columns of caps and to successively bring said columns into alinement with said open upper end of the cap passage.

22. A receptacle capping machine having a holder for presenting and maintaining caps in receptacle mouth receiving position and formed with a vertical cap passage leading to said holder and having an open upper end, a receptacle arranged above said open upper end and having an elongated bottom opening communicating therewith, and means for automatically feeding said receptacle transversely with respect to said open upper end, said receptacle adapted to receive a carton containing parallel rows of vertically arranged caps, substantially as described.

23. A receptacle capping machine, in combination with a movable holder having an elongated bottom opening, mechanism for automatically feeding said holder in a direction alined with the longitudinal axis of said bottom opening, and a carton arranged in said holder and adapted to contain parallel vertical columns of caps with their lower ends arranged over said opening and adapted to successively discharge each column therethrough cap by cap.

24. In combination, in a receptacle capping machine, mechanism for applying caps to receptacle mouths, means for feeding a cap to said mechanism at each capping operation thereof, a movable holder adapted to contain a series of parallel vertical columns of caps and to deliver the caps one at a time from a column to said means and to move forward a feeding stroke after each column of caps has been exhausted, and automatic feeding mechanism for said holder comprising cap counting means operatively connected with and actuated by said mechanism for applying caps to receptacle mouths.

25. In combination, in a bottle capping machine, mechanism for applying caps to bottle mouths, means providing a cap passage thereto, a movable holder adapted to receive a carton having a row of parallel vertical columns of caps, means for moving said holder step by step to successively bring said columns into alinement with said passage so that the caps can drop thereinto by gravity, and operating devices for said means.

26. A capping machine having a vertically movable bottle table provided with an automatic bottle neck grasping and centering device comprsing a spring pressed head, swinging fingers, and means for causing a stroke thereof which may vary according to the size of the bottle neck.

27. A receptacle capping machine having a receptacle table movable vertically on its upward receptacle capping stroke and downwardly on its return stroke and provided with receptacle body positioning means, and with an automatic receptacle neck grasping and centering device arranged to grasp and center the neck of the receptacle on the upward stroke thereof and to release the same on the downward stroke thereof.

28. In combination, in a capping machine, capping means, a bottle table movable toward said means on its operative stroke and away from said means on its return stroke, automatic bottle neck holding and centering mechanism, and operating means therefor constructed and arranged to cause said mechanism to grasp and center the bottle neck on the operative stroke of the table and to release the bottle neck on the return stroke of the table, said mechanism comprising movable bottle neck grasping members having a variable stroke determined by the size of the bottle neck.

29. In combination, in a capping machine, a vertically movable bottle table, and automatic bottle grasping and centering mechanism comprising a movable centering head and opposing movable fingers and operating means therefor embodying a spring exerting its tension to move said head and fingers to bottle grasping position.

30. A machine for automatically applying caps to receptacle mouths comprising rotary cap spinning or curling means, a chuck for holding a cap in receptacle receiving position and alined with the axis of rotation of said means, and mechanism for automatically feeding the caps in a path alined with the axis of rotation of said means and successively delivering the same to said chuck for application to such receptacles.

31. A machine for automatically applying flanged caps to receptacle mouths and spinning or curling the same thereon comprising a vertical tubular member forming the machine head, a rotary cap spinning or curling device concentrically arranged with respect to said head, means for bringing the cap and receptacle together in a direction alined with the axis of rotation of said device, and mechanisms for automatically feeding the caps centrally and longitudinally through said head in a path alined with said axis of rotation and for successively presenting the caps for application to such receptacles.

32. A receptacle capping machine comprising a frame, a vertically disposed head arranged thereon, a cap chuck, cap locking means, a cam shaft provided with cams adapted to actuate said cap chuck and cap locking means, respectively, and operative connections between said cams and said cap chuck and cap locking means consisting of collars slidably mounted on said head, and a series of levers and rods connecting said cams and collars and said cap chuck and cap locking means with said collars, respectively.

33. A receptacle capping machine comprising a vertically arranged head, a cap chuck on said head, and operating means for said cap chuck consisting of collars slidably mounted on said head, a cam shaft provided with cams adapted to actuate said collars, operative connections between said cams and collars and means connecting said collars with said cap chuck.

34. A receptacle capping machine having a vertically arranged head, a cap chuck, cap locking means and operating means for said chuck and locking means comprising a shaft provided with cams, slide rods mounted on said head operatively connected with said cap chuck and cap locking means and a series of collars slidably mounted around said head for actuating said slide rods, and connections between said cams and said collars whereby movement is imparted to said slide rods to operate said cap chuck and cap locking means.

35. A receptacle capping machine comprising a frame, a vertically disposed head arranged thereon, a vertically movable receptacle table, a cap chuck, cap locking means, a cam shaft provided with cams adapted to actuate said receptacle table, cap chuck and cap locking means, respectively, and mechanism connecting said cap chuck and cap locking means with their respective cams comprising movable means on said head operatively connected with said cams and slide rods mounted in said head and connecting said cap chuck and cap locking means with said movable means on said head.

36. A bottle capping machine for applying flanged caps to receptacles comprising means for maintaining a vertical column of edgewise-arranged caps loosely abutting at their edges and permitting said caps to feed downwardly as the lower cap is removed, and mechanism for upholding said column of caps and receiving said lower cap and turning the same to a horizontal position and for holding and backing said cap in bottle mouth receiving position with its open side down, said mechanism comprising a turn-over cap holding chuck and periodically operated cap gripping jaws.

37. A receptacle capping machine having a vertically arranged head provided at its lower end with a turn-over cap holding and backing chuck for turning a cap from a vertical or edgewise position to a horizontal position with its open side down and for sustaining the sealing pressure of the capping operation, periodically moving cap gripping jaws, means for timing the movements of said jaws, and means for feeding edgewise or vertically arranged caps to said chuck.

38. A receptacle capping machine having a head provided with a cap receiving and turn-over cap holding and backing chuck embodying periodically-movable cap gripping jaws, and means for timing the movements of said jaws and of said chuck, substantially as described.

39. In combination, in a bottle capping machine, a frame, a vertical longitudinally-elongated member fixed thereto and forming the machine head and having a cap passage extending longitudinally therethrough, a rotary member concentric with said member and having cap locking means at the lower end of said member, means to support a bottle in capping position alined with and below said member, mechanisms carried by said member for sustaining a column of caps in said passage and for successively receiving the bottom cap therefrom and holding the same in bottle receiving position at the lower end of said member and backing the cap during the capping operation, and timing and operating devices for said cap locking means, bottle supporting means and mechanisms, substantially as described.

40. In combination, in a bottle capping machine, a tubular member having a straight cap passage extending longitudinally therethrough, a frame having means clamping said member in a vertical position, a rotary member carried by said frame concentric with said member and provided with cap locking means extending below said member, means for supporting a bottle in bottle capping position alined with said member and with its mouth at the lower end thereof and for exerting upward sealing pressure on said bottle, and mechanisms carried by said member for holding and backing a cap during and sustaining the pressure of the capping and sealing operation and for sustaining a column of caps in said passage and for successively removing the bottom cap therefrom.

41. In combination, in a bottle capping machine, a head having a cap passage, and mechanisms for sustaining a column of caps in said passage and for successively removing the bottom cap therefrom and holding the same at the capping position and sustaining the cap under capping pressure comprising a turn-over cap chuck mounted in said head, periodically-operating radially movable cap grippers, and positively operating timing mechanism for said chuck and grippers.

42. In combination, in a bottle capping machine, a fixed tubular head, a cap tube extending longitudinally therethrough, and a rockable turn-over cap holding chuck mounted in the lower end of said head and arranged to sustain a column of caps in said tube and normally closing the lower end of said tube and provided with periodically movable cap grippers, means for rocking said chuck through a half revolution and return on each capping operation and for opening and closing said grippers on each capping operation.

43. A bottle capping machine having a rockable turn-over cap-holding chuck provided with periodically-movable cap grippers, and means for rocking said chuck through a half revolution and return and for opening and closing said grippers on each capping operation.

WILLIAM E. HEATH.